April 16, 1929.   H. W. NORGAARD   1,709,227
COMBINED LEVEL AND ANGLE MEASURING INSTRUMENT
Filed Dec. 17, 1925
Fig. 1.
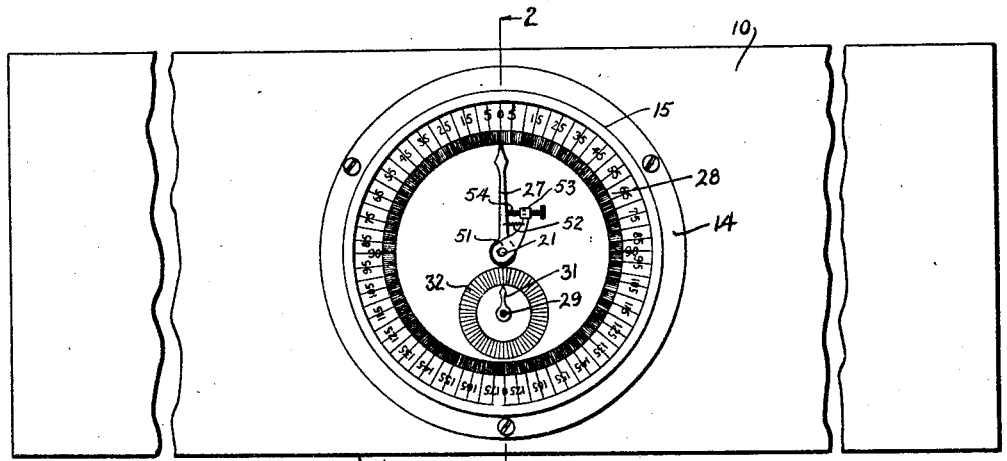
Fig. 2.  Fig. 3.  Fig. 4.
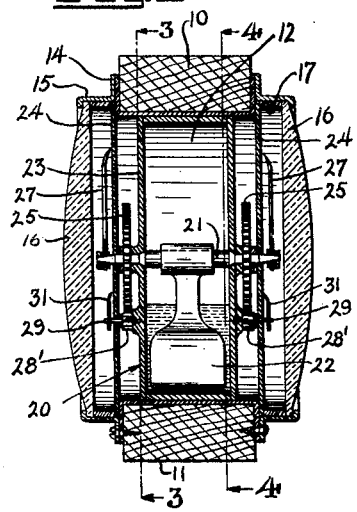 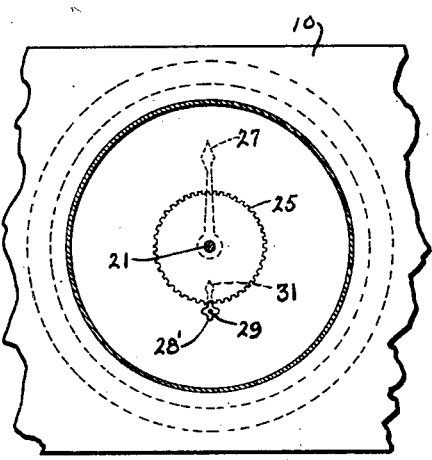 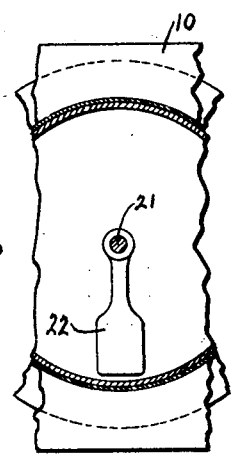
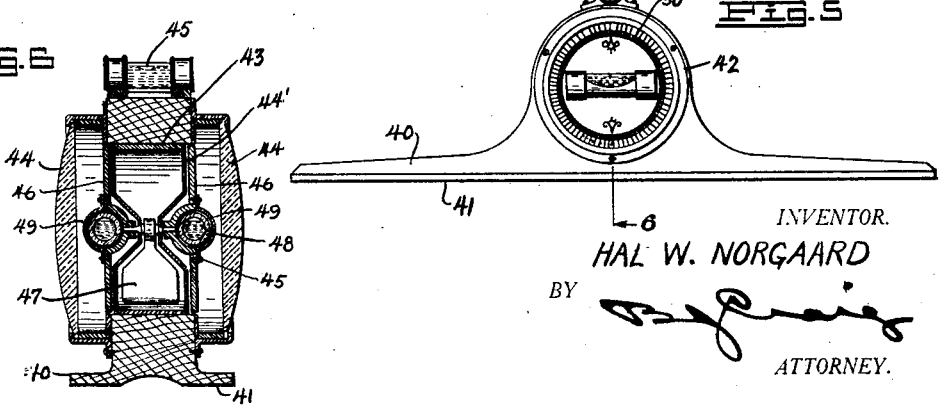
Fig. 6.  Fig. 5.
INVENTOR.
HAL W. NORGAARD
BY
ATTORNEY.

Patented Apr. 16, 1929.

1,709,227

UNITED STATES PATENT OFFICE.

HAL W. NORGAARD, OF BURBANK, CALIFORNIA, ASSIGNOR OF ONE-THIRD TO BYRON B. PALMER, OF BURBANK, CALIFORNIA.

COMBINED LEVEL AND ANGLE-MEASURING INSTRUMENT.

Application filed December 17, 1925. Serial No. 75,944.

This invention relates to a combined level and angle measuring instrument.

The general object of the invention is to provide a level which may be used for the purpose of determining whether surfaces are plumb and which may also be used to measure angles of inclination accurately.

Another object of the invention is to provide a level having dial indicating means thereon whereby the angle of inclination of a plane surface may be determined.

Another object of the invention is to provide a level wherein improved means is utilized for enabling small angles to be read.

Other objects of the invention will be apparent from the following description taken in connection with the accompanying drawings, wherein:

Fig. 1 is a front elevation partly broken away showing my improved level;

Fig. 2 is a transverse sectional view taken on line 2—2, Fig. 1;

Fig. 3 is a fragmentary section on line 3—3, Fig. 2;

Fig. 4 is a fragmentary section on line 4—4, Fig. 2;

Fig. 5 is an elevation of a modification of my improved invention, and

Fig. 6 is a section on line 6—6, Fig. 5.

Referring to the drawing by reference characters, I have shown a level embodying the features of my invention at 10. This level includes a body portion having a plane lower surface 11. The body may be made of wood, metal or composition. It is provided with an aperture 12 in which a flanged collar 14 is fitted.

Upon the flange collar 14 I arrange rings 15 each of which serves to hold a magnifying lens 16. Each lens 16 is seated on a collar 17 as shown in the drawing.

Within the cavity I arrange a hollow case 20. This case is provided with a shaft 21 which has a weight 22 fixed thereon. Between the wall 23 of the case 20 and a cover part 24 I mount a gear 25 which is pinned to the shaft 21. The shaft 21 projects beyond the covers 24 and is provided with an indicator 27 which moves over a scale 28 marked on the cover 24.

The gear 25 meshes with a gear 28' which is keyed to a shaft 29. The gear 28' is fixed, and the shaft 29 which supports the gear 28' has an indicator 31 thereon. This indicator passes over a scale 32 as shown.

Any arrangement of scales 28 and 32 may be provided but I prefer to arrange large divisions on the scale 28, each of which represents five degrees while the subdivisions represent one degree. The scale 32 as shown bears a ratio of one to fifteen with respect to the scale 28. For every small division point that the needle 27 passes over on the scale 28 the needle 31 will pass over four divisions of the scale 32. It will thus be seen that each division on the scale 32 represents fifteen minutes of arc so that both the degrees and minutes of inclination of the edge 11 may be determined. The upper edge as well as the lower edge of the member 10 may be plane so that either surface may be used for measuring. The specific gear ratio is merely for the purpose of illustration and I wish it to be understood that other ratios may be employed without departing from my invention.

In Figs. 5 and 6 I show a modification of my invention wherein the level 40 is provided with a plane lower portion 41 and with a protuberance 42 which has a cavity 43 therein. This cavity 43 has lens 44 mounted at either end thereof. These lens may be held in the same manner as that previously described in connection with the preferred embodiment.

Mounted upon the top of the level I show a gauge glass or bubble 45 for indicating when the level is horizontal. Within the aperture 43 I mount a case 44'. This case 44' has bearings for a shaft 45 on which are mounted discs 46. The shaft is also provided with a pendant weight 47. Upon each disc 46 I arrange a bubble glass 48. Each glass fits within a recess in the discs 46 and is held in place by a clip 49. A scale 50 is provided beneath the lens 44 on each side of the level, so that the angle of inclination may be read thereon.

From the foregoing description it will be apparent that I have provided a novel form of level by which small angles of inclination may be accurately determined. My improved level can be manufactured at small cost and is not liable to get out of order.

Any type of indicator may be employed. I show a member 51 which is fixed on the shaft 21. The indicator arm 27 is free on the shaft 21, but is connected to the member 51 by means of a spring 52. The end of the member 51 has a threaded boss 53 through which an adjusting screw 54 extends. This adjusting screw engages the arm 27. With this arrangement the arm 27 may be brought to a correct zero position even if the member is fixed slightly off center.

If desired glycerine may be placed in the case 20 to damp the action of the pendulum.

Having thus described my invention, I claim:

In a level, a body having a plane face thereon, a case in said body, a cover for each side of said case, a shaft journaled in each of said covers to rotate in said case, a weight secured to and pendant from said shaft, said weight being fitted in said case and movable through 360°, a plate spaced from each of said side covers and having a protractor scale on each of said plates, said shaft projecting through each of said covers and said scale plates, an indicator positioned on each end of said shaft and movable relative thereto, said indicators being adapted to move over said protractor scale plate a full 360°, means to adjust said indicators, said means including brackets secured to said shaft adjacent each of said indicators, an internally screw-threaded boss on said brackets, a thumb screw positioned in each of said bosses, said thumb screws adapted to contact with said indicators, springs connecting said indicators and said brackets, said springs being adapted to urge said indicators and said brackets together, gears on said shaft, said gears being positioned between each of said case side covers and said scale plates, a second and a third shaft positioned at one side of said first shaft, said second and third shafts being journaled in said case side covers and said scale plates, said second and third shafts projecting through the adjacent scale plates, indicators on said second and third shafts, a second protractor scale on each of said scale plates over which said second mentioned indicators travel, said second mentioned scales being non-concentric with respect to said first mentioned scales, a gear on each of said second and third shafts, said gears being in mesh with said first mentioned gears on said first mentioned shaft.

In testimony whereof, I hereunto affix my signature.

HAL W. NORGAARD.